(12) United States Patent
Shaver et al.

(10) Patent No.: US 8,246,053 B2
(45) Date of Patent: Aug. 21, 2012

(54) EXHAUST MANIFOLD GASKET WITH SPRING STEEL EMBOSSED METAL AND GRAPHITE INSULATOR

(75) Inventors: Kevin Shaver, Chicago, IL (US); Martin Mockenhaupt, Buffalo Grove, IL (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 339 days.

(21) Appl. No.: 12/661,719

(22) Filed: Mar. 23, 2010

(65) Prior Publication Data

US 2011/0233875 A1  Sep. 29, 2011

(51) Int. Cl.
F02F 11/00 (2006.01)

(52) U.S. Cl. ........ 277/590; 277/597; 277/650; 277/654; 277/601

(58) Field of Classification Search .......... 277/590–592, 277/597, 601–602, 650, 654
See application file for complete search history.

(56) References Cited

U.S. PATENT DOCUMENTS

| | | | |
|---|---|---|---|
| 2,888,742 A * | 6/1959 | Stumbock | 428/556 |
| 3,970,322 A | 7/1976 | Stecher | |
| 4,397,472 A | 8/1983 | Czernik | |
| 4,448,431 A * | 5/1984 | Majewski et al. | 277/601 |
| 4,776,602 A | 10/1988 | Gallo | |
| 5,277,433 A | 1/1994 | Ishikawa | |
| 5,360,219 A * | 11/1994 | Okuda et al. | 277/592 |
| 5,505,466 A | 4/1996 | Willis | |
| 5,511,796 A | 4/1996 | Udagawa | |
| 5,522,604 A | 6/1996 | Weiss | |
| 5,772,215 A | 6/1998 | West | |
| 6,058,918 A | 5/2000 | Noetzlin | |
| 6,237,919 B1 | 5/2001 | Grant-Acquah | |
| 6,565,099 B1 | 5/2003 | Ottinger | |
| 6,575,473 B2 | 6/2003 | Sugimoto et al. | |
| 6,733,885 B2 * | 5/2004 | Kincart | 428/408 |
| 6,758,479 B2 | 7/2004 | Miyaoh | |
| 2004/0113370 A1 | 6/2004 | Beutter | |
| 2006/0006609 A1 | 1/2006 | Sandford | |

FOREIGN PATENT DOCUMENTS

| | | |
|---|---|---|
| DE | 8522966 | 4/1987 |
| GB | 1512081 | 5/1978 |

* cited by examiner

*Primary Examiner* — Vishal Patel
(74) *Attorney, Agent, or Firm* — Marshall & Melhorn LLC

(57) ABSTRACT

The present invention relates to an exhaust manifold gasket having a metallic core, at least one insulating layer, and an embossed layer. The metallic core has two sides with at least one side having a plurality of projections. The insulating layer has two sides, with the first side contacting the projections of the metallic core and the second side contacting the embossed layer. The embossed layer is a metallic flange having a lower leg, a convex face, and an upper leg.

5 Claims, 3 Drawing Sheets

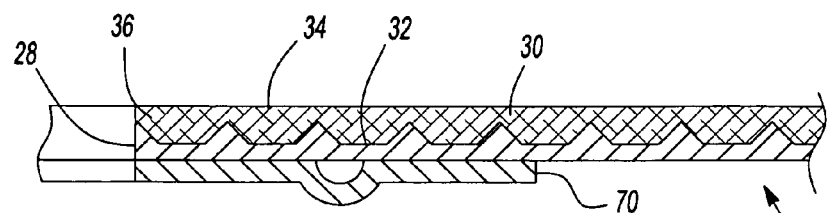
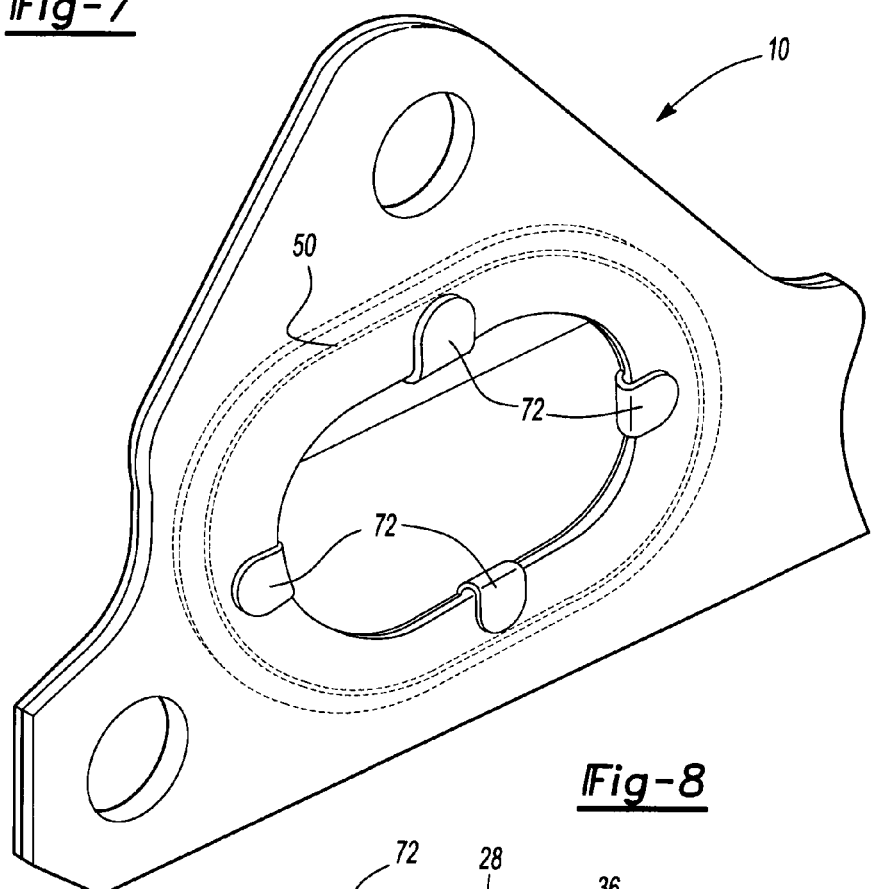
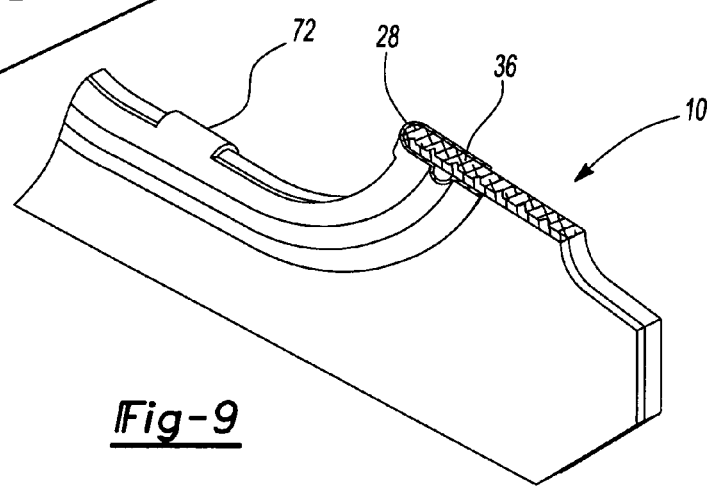

EXHAUST MANIFOLD GASKET WITH SPRING STEEL EMBOSSED METAL AND GRAPHITE INSULATOR

RELATED APPLICATIONS

Not Applicable

FIELD OF THE INVENTION

The present invention relates to a gasket for use in internal combustion engines, specifically an exhaust manifold gasket inserted between a cylinder head and an exhaust manifold.

BACKGROUND OF THE INVENTION

Gaskets essentially are used to seal and prevent leakage between two parts. Exhaust manifold gaskets for internal combustion engines seal the gap between the cylinder head and the exhaust manifold. Sealing the gap, however, can be difficult because the head, manifold and gasket all move due to pressure and temperature fluctuations, which results in the gasket being subjected to constant pressure changes. There are also problems due to thermal expansion and thermal contraction, which occurs when the temperatures varies in the cylinder head base. There are also multiple openings in the head and the manifold for exhaust gases and bolts holes. The areas around these openings are known to be put under additional stresses and leakage is common.

Traditionally, multi-layered or single-layered embossed metal provides poor adaptability and limited insulative properties. Thermal motion, resulting from hot exhaust gases, increasing combustion pressure and steep thermal swings, and sheer stresses are created in this area and the multi or single layered embossed metals become over compressed and do not adequately stop the leakage. The same can be said when graphite faced or a steel grommet is used. The thermal motion eventually causes poor recovery and burn out from the joint movement between the head and the manifold.

In view of the foregoing disadvantages of the prior art, it would be advantageous for a gasket to be able to prevent or resist thermal motion to the extent that it negatively affects performance of the gasket. More specifically, it would be advantageous for a gasket to provide a soft and conformable surface to seal imperfections and surface irregularities, and also to withstand high temperatures and still provide adequate recovery.

SUMMARY OF THE INVENTION

The present invention is directed toward an exhaust manifold gasket comprising a core, at least one insulating layer, and an embossed layer. The core is made of a metal material and has two sides with at least one side having a plurality of projections and may include an adhesive layer. The insulating layer has a first and a second surface and may be made of graphite. The first surface of the insulating layer is attached to the core by either the projections or an adhesive layer. The second surface contacts the embossed layer. The embossed layer is a metallic flange comprised of a lower leg, a convex face, and an upper leg. The convex face connects the upper and lower legs to prevent exhaust gas leakage between the core and the facing layer. The upper leg is parallel to the lower leg and connected at one end to the convex face. Additional embodiments of this invention may include a coating on the flange and/or a flange ring. Finally, another embodiment of the invention may comprise a metallic core, an insulation layer and a lower beaded metallic layer.

In accordance with the present invention, it has been discovered that stress is significantly decreased at the sealing ports, and the embossed metal layers provides more recovery properties than a graphite layer by itself.

BRIEF DESCRIPTION OF THE DRAWINGS

The above, as well as other advantages of the present invention, will become readily apparent to those skilled in the art from the following detailed description when considered in the light of the accompanying drawings in which:

FIG. 7 depicts a cross-sectional view of another embodiment of the present invention;

FIG. 8 depicts a perspective view of the structure in FIG. 7; and

FIG. 9 depicts a partial sectional view through line 9-9 in FIG. 8.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Figure 1:
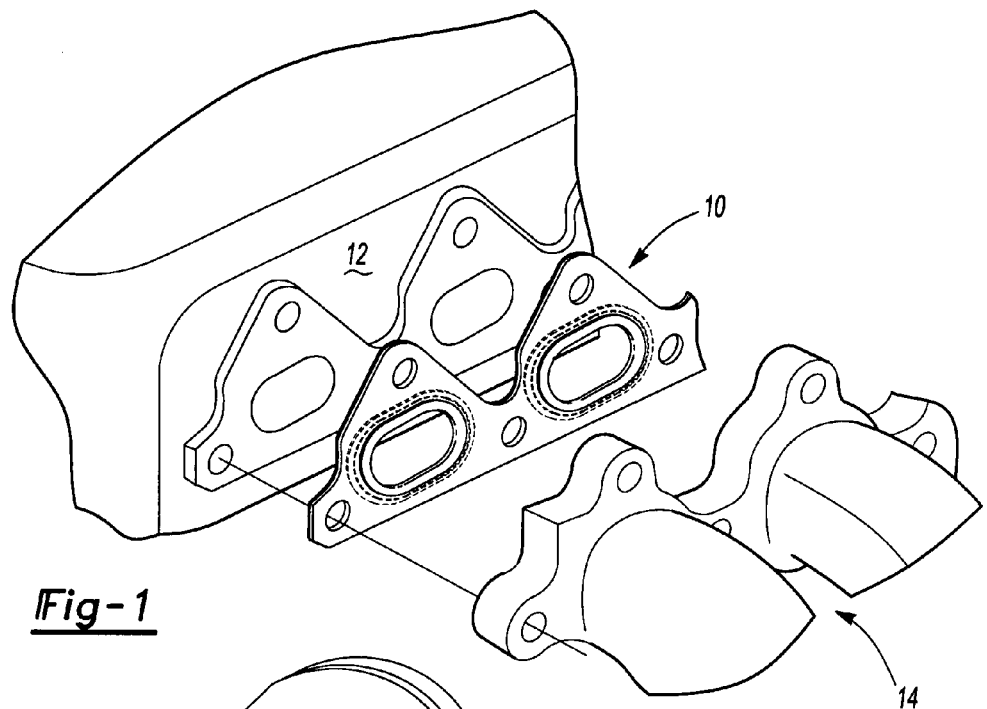
FIG. 1 is a partial perspective exploded view of the present invention with a cylinder head, an exhaust manifold and an exhaust manifold gasket.
Figure 2:
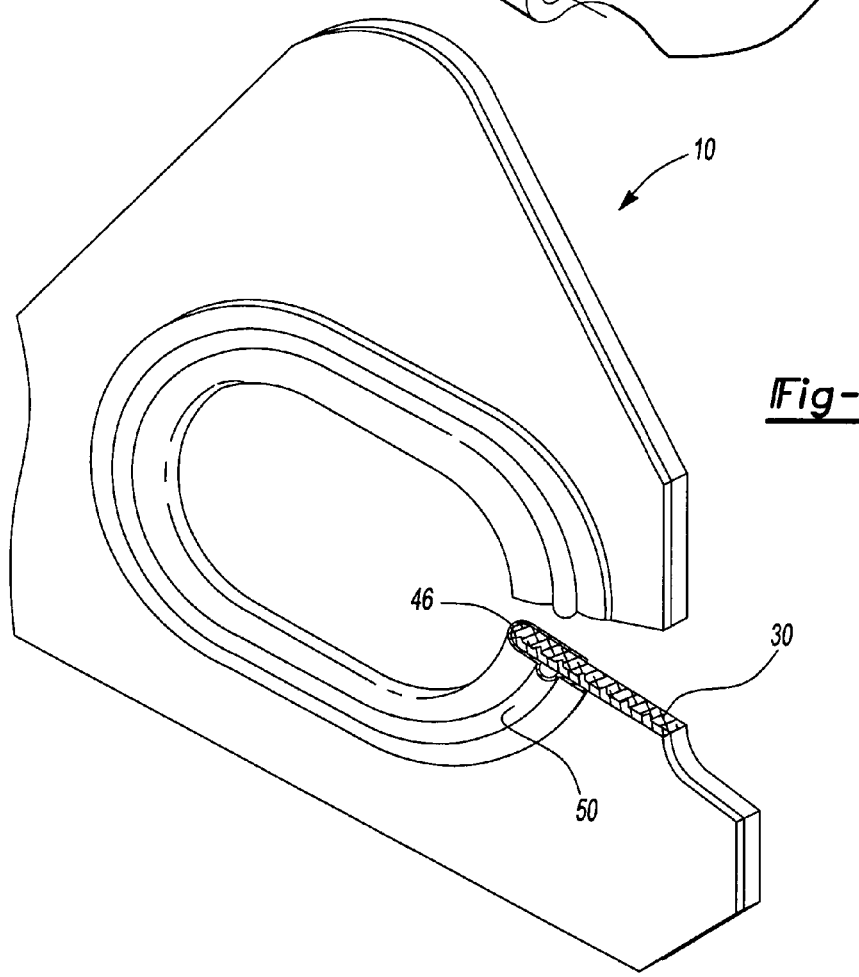
FIG. 2 is a cut-away view of a portion of the gasket depicted in FIG. 1.

An exhaust manifold gasket 10 as shown in FIG. 1 is positioned between a cylinder head 12 and an exhaust manifold 14, so as to create an air tight seal when the two structures are bolted together. The exhaust manifold gasket is manufactured in accordance with the various shapes of cylinder head and exhaust manifolds, and includes numerous openings, such as exhaust gas openings and bolt holes. Various sealing means are created for sealing around the respective openings.

Figures 3, 4, 5, 6A, 6B:
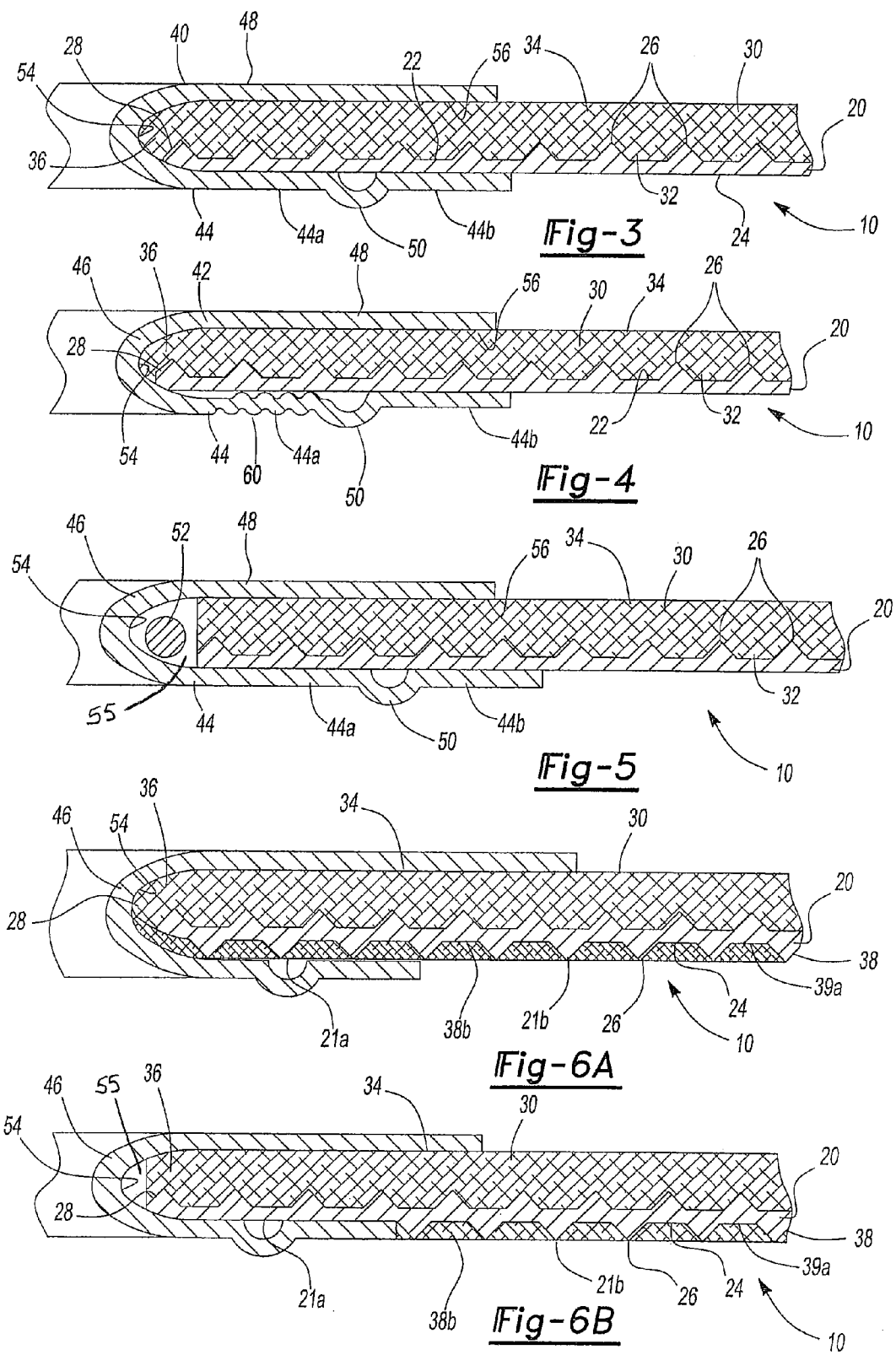
FIG. 3 depicts a cross-sectional side view of the gasket in FIG. 2.
FIG. 4 depicts a second embodiment of the present invention in a cross-sectional view.
FIG. 5 depicts a third embodiment of the present invention in a cross-sectional view.
FIG. 6a depicts a fourth embodiment of the present invention in a cross-sectional view.
FIG. 6b depicts a fifth embodiment of the present invention in a cross-sectional view.

The exhaust manifold gasket 10, as shown in FIG. 3, is comprised of metallic core 20, at least one insulating layer 30, and an embossed layer 42. The metallic core 20 comprises a first surface 22, a second surface 24 and a combustion opening edge 28. The first surface 22 of the metallic core 20 includes a plurality of projections 26 which engage a first surface 32 of the insulating layer 30, and accordingly act to hold the insulating layer 30 in contact with the metallic core 20. The low projection height on the metallic core 20 prevents heat transfer through the insulating layer 30. It is also within the scope of the present invention for the metallic core 20 to be double sided with projections 26 on both the first surface 22 and the second surface 24, as shown in FIGS. 6a and 6b. A double sided core provides extra insulation and a stopper effect, limiting the amount of compression force exerted on the gasket when it is assembled. Also as shown in FIG. 6b, the second surface of the metallic core 24 comprises a first portion 21a and a second portion 21b, with the first portion 21a being planar and the second portion 21b comprising the projections 26.

The insulating layer 30, comprising a first surface 32, a second surface 34, and a combustion opening edge 36, is non-metallic and may be graphite. The insulating layer 30 protects engine hardware by hindering heat transfer from the hot exhaust manifold to the cylinder head, and protects the beaded side of a metal flange 40 from intense temperatures. The first surface 32 of the insulating layer 30 contacts the first surface 22 of the metallic core 20 and is held in place by the projections 26 on the metallic core 20 and/or by applying an adhesive material to the metallic core 20. The second surface 34 of the insulting layer 30 contacts an embossed layer 42 and the exhaust manifold surface. The combustion opening edge 28 of the metallic core 20 and the combustion opening edge 36 of the insulating layer 30 are aligned with each other and form a gap or pocket 55 near an inner wall 54 of a convex face 46 of the embossed layer 42. It is also within the scope of the invention for the insulating layer 30 to be unitary and homogeneous. The insulating layer 30 may extend to and directly contact an inner wall 54 of the convex face 46 of the embossed layer 42, as shown in FIG. 3. The insulating layer 30 provides a conformable surface that allows for better sealing properties on surfaces with poor hardware conditions, such as pits and/or abrasions on the surface. It is also within the scope of the present invention to comprise a second insulation layer 38, as shown in FIGS. 6a and 6b. The second insulation layer 38 comprises a first surface 39a and a second surface 39b, wherein the first surface 39a of the second insulation layer 38 contacts the second surface 24 of the metallic core 20.

The embossed layer 42 is a metallic flange 40 comprised of a lower leg 44, a convex face 46, and an upper leg 48. The embossed layer 42 acts as a high stress shim that has recovery from joint motion. When movement and compression are applied to the gasket during normal engine operation, the shim helps to prevent over compression of the gasket and also provides protection to help keep the gasket from prematurely wearing out. The lower leg 44 may be comprised of a first portion 44a and a second portion 44b, wherein the first portion of the lower leg 44a has a bead 50. The lower leg 44 is at least as long as the upper leg 48, and is connected to the convex face 46, or flanged area, at one end of the first portion 44a. A lower surface 56 of the upper leg 48 is in direct contact with the second surface 34 of the insulation layer 30. It is also within the scope of the present invention for the second portion of the lower leg 44b or the first portion of the lower leg 44a to comprise a plurality of connecting waves and troughs 60. The convex face 46 connects the upper leg 48 and lower leg 44 to prevent gas leakage between the metallic core 20 and the insulating layer 30. The upper leg 48 is parallel to the lower leg 44. The metallic flange 40 encloses a portion of the insulating layer 30 and the metallic core 20. The flange 40 may be coated and may or may not include a flange ring 52, as shown in FIG. 5.

A flange ring 52 may be located between the inner wall 54 of the convex face 46 and the combustion opening edge 28 of the metallic core 20 and the combustion opening edge 36 of the insulating layer 30. The flange ring 52 protects the insulating material and provides a stopper effect. The flange ring 52 may also be coated to inhibit heat transfer and reduce friction.

FIG. 7 depicts another embodiment of the present invention which comprises a metallic core 20, an insulation layer 30 and a second metal layer 70. The second metal layer 70 may comprise a bead and extends outward of the combustion opening and extends partially over the metallic core 20.

The second metal layer 70 may comprise tabs 72, as shown in FIGS. 8 and 9. The tabs 72 may be integrally formed and equidistance apart along the edge of the combustion opening, and extend around the combustion opening edge 28 of the metallic core 20 and the combustion opening edge 36 of the insulation layer 30, as shown in FIGS. 8 and 9. The tabs 72 secure the metallic core 20, the insulation layer 30, and the second metal layer 70 together in a stacked position during assembly of the manifold gasket 10 between the cylinder head 12 and the exhaust manifold 14.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. An exhaust manifold gasket, comprising:
    a metallic core comprising a first surface, a second surface and a combustion opening edge, wherein a plurality of integrally formed projections extend upwardly from said first surface, said second surface being a continuous planar surface;
    an insulation layer comprising a first surface, a second surface and a combustion opening edge aligned with said combustion opening edge of said metallic core, said insulation layer being a substantially constant thickness along the length of said metallic core, and said second surface being substantially planar, said first surface of said insulation layer being in direct contact with said first surface of said metallic core;
    a second metal layer, wherein said second metal layer has integrally formed therewith a full bead extending away from said second surface of said metallic core, said second metal layer comprising integrally formed and equidistantly spaced tabs, wherein the areas between said tabs of said second metal layer are in direct contact with said second surface of said metallic core, wherein said second metal layer has an end portion that is outward of said full bead and said combustion opening, wherein the end portion is in direct contact with the second surface of the metallic core.

2. An exhaust manifold gasket according to claim 1, wherein said tabs extend around said combustion opening edge of said insulation layer and said metallic core to said second surface of said insulation layer.

3. An exhaust manifold gasket according to claim 1, wherein said tabs secure said metallic core, said insulation layer and said second metal layer together.

4. An exhaust manifold gasket according to claim 1, wherein said tabs terminate on said second surface of said insulation layer before they are radially opposite said full bead.

5. An exhaust manifold gasket according to claim 1, wherein said tabs are substantially equidistant from one another.

* * * * *